March 2, 1965 G. A. ALPHONSE 3,172,084

SUPERCONDUCTOR MEMORY

Filed Aug. 30, 1961 2 Sheets-Sheet 1

INVENTOR.
GERARD A. ALPHONSE
BY
Samuel Cohen
Attorney

INVENTOR.
GERARD A. ALPHONSE
BY
Samuel Cohen
Attorney

United States Patent Office 3,172,084
Patented Mar. 2, 1965

3,172,084
SUPERCONDUCTOR MEMORY

Gérard A. Alphonse, New York, N.Y., assignor to Radio Corporation of America, a corporation of Delaware Filed Aug. 30, 1961, Ser. No. 135,045
17 Claims. (Cl. 340—173.1)

The present invention relates to memories. More particularly, the invention relates to an improved arrangement for sensing the output of a memory such as a superconductor memory.

A superconductor memory such as described in the Digest of Technical Papers, 1961 International Solid States Conference, pages 110–111 includes a thin film superconductor plane for storing persistent circulating currents. The drive lines for the memory are located on one side of the plane. They consist of a group of X drive wires which extend in one direction and a group of Y drive wires which extend in another direction. The intersections between X and Y drive wires are memory locations. In general, the memory is operated so that each intersection stores one binary bit.

The sense line from the memory is placed on the other side of the memory plane from the drive lines. It consists of a winding which is laid down in a zig-zag pattern that is carefully aligned with the intersections of the X and Y drive lines. The disadvantage of this sensing technique is the severe registration problem it creates. The alignment between the sense line and the XY drive line cross-over points must be precise and, in view of the close spacing of the cross-over points, the problem of obtaining such alignment may be formidable. In the memory shown in the article above, the spacing between XY cross-over is about 50 mils in each direction. Even here, the registration problem is severe. In an enlarged memory presently proposed, there are 128 X drive lines and 128 Y drive lines, providing at total of 16,384 storage locations. The total area on which these cross-overs are located is 1.28 inches by 1.28 inches—a spacing of less than 10 mils between cross-overs. In a memory of this size, the problem of precisely registering a zig-zag sense winding with each XY line intersection appears to be insurmountable, at the present state of the art.

One object of the present invention is to provide a simplified arrangement for sensing the output of a memory such as a superconductor memory.

Another object of the invention is to provide a sensing arrangement which does not require precise registration between a sense winding and storage locations in the memory.

Another object of the present invention is to provide a sensing arrangement which provides a relatively high output voltage and which has a relatively good signal-to-noise ratio, that is, a relatively good "1:0" ratio. 1:0 ratio as used here relates to the relative voltage outputs obtained from the memory when reading binary "one" and binary "zero" from the memory respectively.

Another object of the present invention is to provide a sensing means for a memory which provides good shielding against the stray pickup of signals.

Another object of the invention is to provide a sensing arrangement for a superconductor memory which can easily be fabricated as, for example, by vacuum evaporation.

The arrangement of the present invention includes a conductive plane arranged parallel to the memory plane and forming therewith a parallel plane transmission means. A pair of output terminals is located at one end of the transmission means. The other end of the transmission means is preferably terminated in a short circuit. The drive means are so located that a magnetic field component can be induced in the space between the two planes in a direction parallel to the planes and perpendicular to the desired direction of current flow, that is, perpendicular to the direction from the parallel plane termination to its output terminals. It is believed that the magnetic field induces an electric field perpendicular to the direction in which the planes extend. These two field components, namely the magnetic and electric field components, are believed to be the components of an electromagnetic wave in the TEM mode. A wave in this mode propagates in a direction perpendicular both to the electric and magnetic fields, and this is the direction toward the output terminals.

The invention is described in greater detail below and is illustrated in the following drawings of which:

Figures 3, 4:
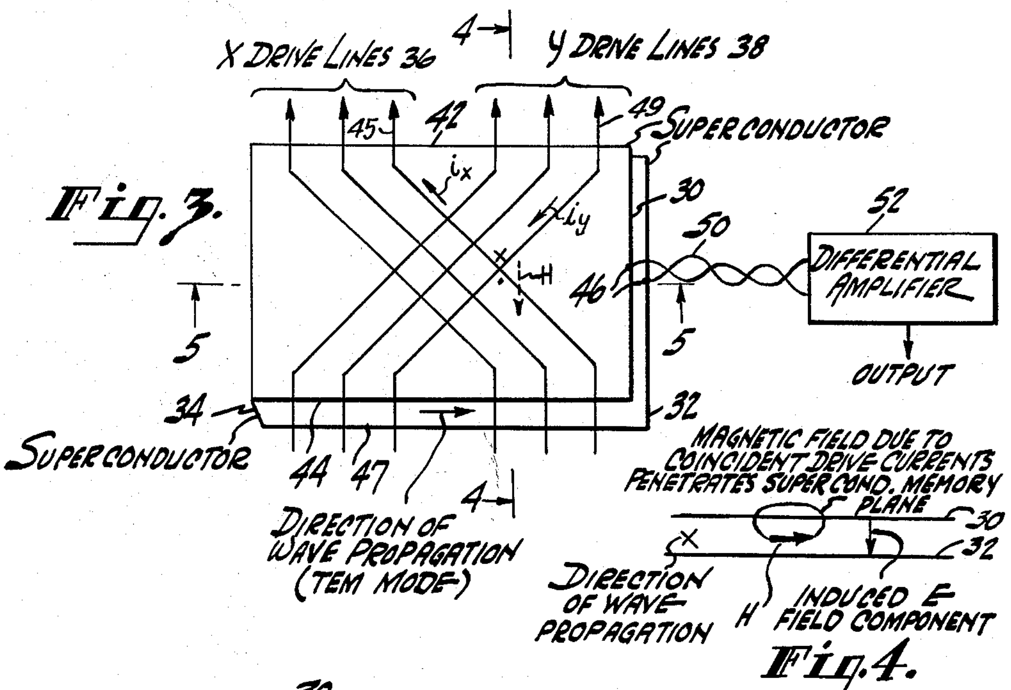
FIG. 3 is a diagrammatic showing of a memory according to the present invention.
Figure 5:
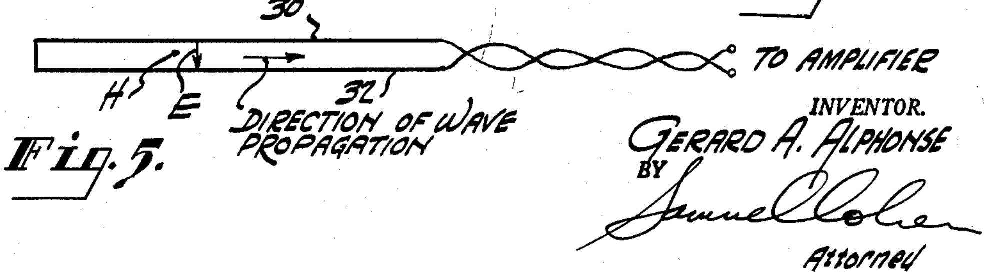
Figure 6:
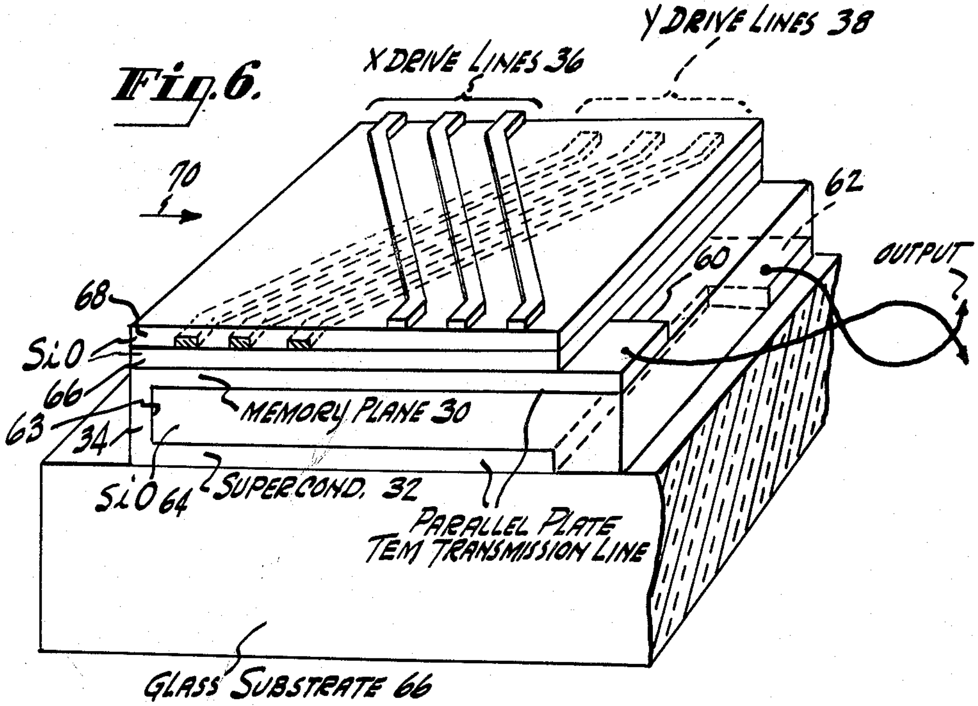
Figure 7:
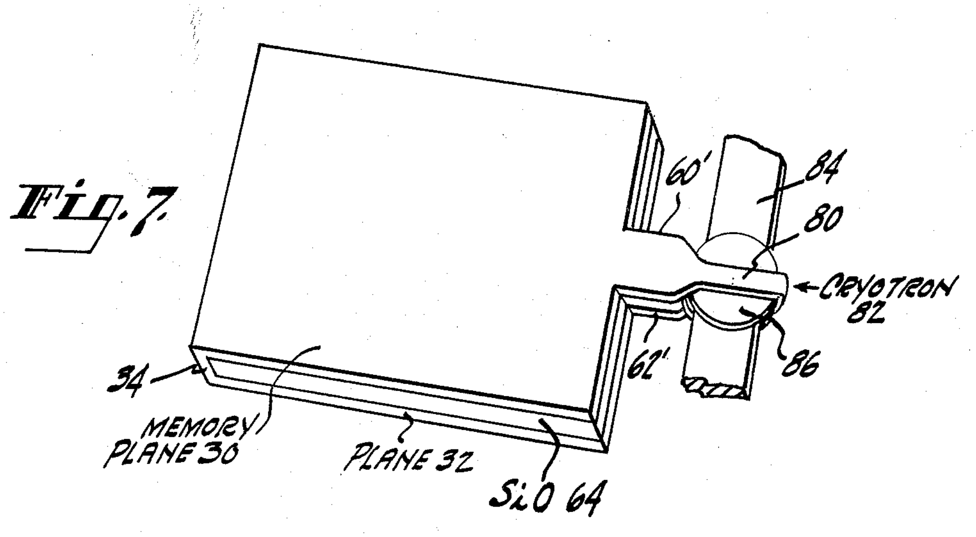

FIGS. 4 and 5 are sections along lines 4—4 and 5—5 of FIG. 3. These figures illustrate the direction of the electromagnetic wave components induced in a parallel plane transmission line;

FIGURE 6 is a perspective, partially cut-away view of a portion of a memory according to the present invention; and FIG. 7 is a perspective view of a portion of the memory of the invention showing an alternative type of sensing arrangement.

In the discussion which follows, similar reference numerals are applied to similar elements. Also, although not shown, it is to be understood that the memory discussed is maintained at a low temperature, such as several degrees Kelvin, at which superconductivity is possible.

Figure 1:
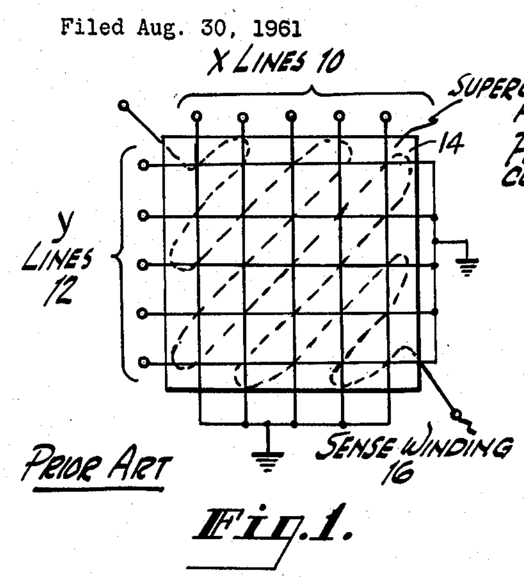
FIG. 1 is a diagrammatic showing of a prior art superconductor memory.

The known memory shown in FIG. 1 includes X drive lines 10 and Y drive lines 12. A superconducting plane 14 located beneath the X and Y lines serves as the storage medium. A zig-zag sense winding 16 is located beneath the superconducting plane 14. As can be seen in the figure, the sense winding is in registration with the X and Y cross-overs.

In practice, there are many more X and Y lines than are shown. Further, there is insulation between the various lines and planes. A more complete description of a memory may be found in the article cited above and in application Serial No. 76,648, now abandoned, filed December 19, 1960, by L. L. Burns, Jr., and assigned to the same assignee as the present invention.

Figure 2:
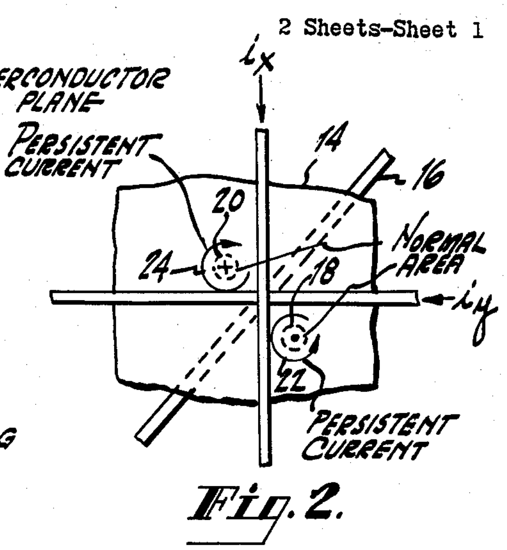
FIG. 2 is a sketch to help explain the operation of the circuit of FIG. 1.

In the operation of a memory such as shown in FIG. 1, coincident currents applied to selected X and Y lines are of sufficient amplitude, taken together, to produce a magnetic field which exceeds the critical field of the superconductor in the areas indicated by a dot and cross in FIG. 2. (The dot represents a magnetic field coming out of the plane of the paper and the cross represents a magnetic field going into the plane of the paper). These areas, namely 18 and 20 switch from their superconducting to their normal state. The magnetic field due to the currents $i_x$ and $i_y$ now penetrates this superconductor (in its superconducting state the superconducting plane 14—actually a superconducting film, acts as a shield to a magnetic field) and induces persistent circulating currents in the plane. These currents surround the normal areas 18 and 20.

When the X and Y drive currents are reduced to "zero," the magnetic fields surrounding the windings collapse, however, persistent currents remain in the superconductor and circulate in the directions shown at 22 and 24. Persistent currents in these directions can be arbitrarily assumed to represent storage of a binary digit of one value such as "one." Circulating persistent currents in the opposite directions then represent storage of the binary digit "zero."

In order to read out the bit stored at a particular location in the memory, current is applied in a standard direction to the X and Y lines which intersect that location. For example, the current may be applied in a direction to cause a circulating current to be induced in a direction representing storage of the binary digit "zero." In this case, if the memory location interrogated is storing a "one," the interrogation current will cause that area to go normal and a magnetic field will penetrate through the superconductor plane. This magnetic field links the sense winding 16 and induces a current in the sense winding. If the memory location interrogated is storing a "zero," the magnetic field induced by the interrogating currents tends to induce a circulating current in a sense to subtract from the persistent circulating current. In this case, the storage location (such as the area "bridge" between 18 and 20) does not go normal, the magnetic field does not penetrate the film, and no current is induced in the sense winding.

As already indicated, the sensing scheme just described is suitable for memories of relatively small size, that is, for a memory in which the storage locations are relatively widely spaced. In such cases, the X and Y lines are relatively large, the sense line can be made relatively large, and registration between the three lines, although in no sense a simple problem, can be accomplished with the high precision masking techniques presently available. However, as the memory capacity increases and the spacing between cross-over points and drive line widths correspondingly decrease, the registration problem becomes formidable.

The solution to the problem provided by the invention is shown schematically in FIG. 3. The memory plane, corresponding to superconductor plane 14 of FIG. 1, appears at 30. A second plane 32 is placed beneath the superconductor plane and arranged parallel to the plane. Preferably but not necessarily, the second plane is also a superconductor. The plane 30 is joined to plane 32 at one edge, as shown at 34. Preferably, the edges of the two planes are joined along their entire extent as, for example, by a superconductor. This may be done during the evaporation process. The Y drive lines 38 are located above the storage plane and are insulated therefrom. The X drive lines 36 are above the Y drive lines and also are insulated both from the Y drive lines and the memory plane 30. For purposes of illustration, three X drive lines and three Y drive lines are shown, giving a total of nine storage locations.

The operation of the memory shown in FIG. 3, insofar as writing and storage is concerned, is similar to that of the one already described. Each intersection of an X and Y drive line is capable of storing a binary digit. The digit is stored as a circulating current just as is shown in FIG. 2.

In order to read out the memory, coincident currents are applied in a standard direction as, for example, is indicated by the arrows legended $i_x$ and $i_y$ adjacent to the X and Y drive lines 45 and 49, respectively of FIG. 3. If the binary bit stored at a location interrogated such as the location beneath the intersection of the lines 45 and 49 is such that the interrogation currents switch the location normal, a magnetic field penetrates the superconductor plane as is best shown in FIG. 4. The magnetic field H between the two planes is in a direction parallel to the planes (see FIG. 3) and perpendicular to the desired direction of wave propagation. This magnetic field component is believed to induce an electric field component which is perpendicular to the magnetic field component and to the planes. This electric field component is shown at E in FIGS. 4 and 5.

The two components above make up an electromagnetic wave and it is found that the wave propagates in the desired direction as is indicated by the arrow in FIGS. 3 and 5 legended "Direction of Wave Propagation." It is believed that this corresponds to the propagation of a wave in the TEM mode, as a wave in this mode propagates in a direction perpendicular to its electric and magnetic field components. A more detailed theoretical discussion of the wave propagation in the TEM mode may be found in Chapter 11 of the volume Electromagnetics by John D. Kraus.

In order to check the theory above, the means employed to induce a magnetic field H between the parallel planes was changed in orientation so that the magnetic field H was in a direction parallel to the edges 42 and 44 of the memory plane. It was found, under these conditions, that the output signal disappeared from the output terminals 46. It was also found, under these conditions, that when the edge 42 of plane 30 was joined to the corresponding edge of plane 32 and the edge 34 was opened, an output signal could be detected between the edges 44, 47 of planes 30 and 32, respectively.

Tests have been made with different terminations for the parallel plate transmission lines 30, 32. It was found that the superconductor termination as shown at 34 gave the best performance. A fairly good output pulse (of lower amplitude) was also obtained when the two plates 30, 32 were joined at 34 by a resistor of small value—about 1–3 ohms. However, when all edges of the planes were left open, it was not possible to obtain a suitable output signal at output terminals 46. The exact explanation is not known. It is thought, perhaps, that under these conditions the two planes may act like a capacitor and that an electromagnetic wave will not propagate. However, this matter has not yet been fully considered from a theoretical viewpoint.

In a practical memory according to FIG. 3, the plane 30 may be formed of a superconductor material such as tin. The plane 32 may also be formed of tin, however, if desired, the plane 32 may be formed of lead instead. The spacing between planes 30 and 32 may be achieved by an insulator such as a silicon monoxide film. This film may be 3,000 Angstroms or less to 10,000 Angstroms or more thick. The precise thickness is not a critical dimension. As a matter of fact, good results have been achieved using a glass slide about ⅛ inch thick between the planes 30 and 32.

It is preferred that the X and Y drive lines pass the edges 44 and 42 of the memory plane 30 at right angles. When so oriented, the magnetic fields at the edges of the planes, which result from the current passing through the drive lines, are oriented in a direction such that a TEM mode wave is not induced at the output terminals 46. In other words, the undesired magnetic fields produced at the edges are at right angles to the magnetic field shown in the figure. Accordingly, any TEM mode wave propagation which might result from this magnetic field is in a direction perpendicular to the edges 42, 44 of the superconductor plane 30 rather than parallel to these edges. The invention will operate if the drive lines do not pass the edges of the memory plane at right angles. However, the currents in such lines do induce noise in the output signal at terminals 46.

Preferably, the X and Y drive lines are oriented as shown. This orientation provides a useful magnetic field component H of greatest magnitude for a given drive current. If the magnetic field induced by the current is at an angle to the direction shown, only its component perpendicular to edges 42, 44 is useful. In other words, changes in the directions in which the drive lines extend, may result in smaller output signals.

The output line from the memory connected to terminals 46 is preferably a twisted pair 50. This line leads to a differential amplifier 52 of conventional design. One having a bandwidth of 10 megacycles has been found to be suitable, however, somewhat improved performance may possibly be obtained using a somewhat broader bandwidth such as 20 megacycles. The twisted wire pair has been found to give greatly improved performance over a coaxial line. The latter tends to pick up stray signals on its shield and these tend to mask the signal output available at terminals 46. In the case of the twisted pair the stray pickup voltages cancel.

In checking the operation of the sensing means of the present invention, a drive signal of 50 nanoseconds duration was employed. The output signal available at terminals 46 was found to be of roughly the same duration but with slightly deteriorated leading and lagging edges. There was substantially no delay between the drive signal and the output signal.

It is believed that the wave propagated by the parallel planes has frequency components up to about 10 or 20 megacycles. The amplitude of the signal sensed at terminals 46, under different conditions, is about 10 millivolts on the average. The signal-to-noise ratio was found to be extremely good—of the order of 20:1 or more. The small amount of noise present is believed to be due to direct feed through from the pulse generator (not shown). It is believed that this can be reduced by appropriate shielding and filtering.

A perspective view of a part of a memory according to the present invention is shown in FIG. 6. Elements which correspond in function to elements of FIG. 3 have similar reference numerals applied. In practice, a layer of silicon monoxide insulation is placed over the X drive lines, however, this is not shown in the figure. The tabs 60 and 62 serve as "lands" to which the output connections can be made. These are formed by vapor depositing the layers 60, 62 through an appropriately shaped mask. The reason that these tabs are at opposite edges of the memory plane and the superconductor plane parallel to it, respectively, is to permit easier access to the tabs. It should be recalled that the layer of silicon monoxide insulation 64 between the memory plane 30 and the lower plane 32 is relatively thin—perhaps of the order of several thousand Angstroms.

The film 34 may be laid down as part of film 30. This is easily done by employing a mask for the film 30 which laps over the edge 63 of the silicon monoxide layer 64.

A practical memory according to FIG. 6 may have the following dimensions:

Glass substrate 66—1 x 3 x 1/8 inch slide, or 2 x 2 x 1/8 inch slide
Superconductor 32—3,000 Angstroms lead or tin
Silicon monoxide layer 64—3,000 to 10,000 Angstroms
Memory plane 30—3,000 Angstroms (In practice, the memory plane 30 may instead be two layers of tin each 1,500 Angstroms thick separated by a silicon monoxide layer 1,000 Angstroms thick and made as described in the copending application noted above.)
Silicon monoxide layer 66—3,000 Angstroms thick (This layer and all other insulation layers such as 64 and 68 may instead be laid down in two layers in a manner described in application Serial No. 76,288 titled "Insulation" by L. L. Burns, Jr., filed December 19, 1960, and assigned to the same assignee as the present invention.)
X and Y drive lines—3,000 Angstroms thick (The width of these lines and the spacing between them depends upon the number of storage locations it is desired to pack into the limited space available. Typical widths are 5–15 mils, however, for very large capacity memories, widths of substantially less than 5 mils may be used.)
Silicon monoxide layer 68 and the covering layer which is not shown—each 3,000 Angstroms thick It has already been mentioned that it is preferable that the X and Y drive lines pass the edge of the ground plane at substantially right angles. It is also possible to run either the X or Y drive lines over the short circuited edge of the parallel plane transmission lines, that is, to run the drive lines over the edge 34, in the direction indicated by arrow 70. When this is done, the direction taken by the drive line is unimportant since the superconducting termination 34 shields the parallel plate transmission line from the currents in the drive line.

The memory shown in part in FIG. 7 (the drive lines and a number of other elements are not shown) employs a different type of sensing arrangement than the memory of FIG. 6. The tabs 60', 62 are formed at the center of one edge of the memory and superconductor planes, respectively. These tabs are narrowed in width to form the control element 80 of a cryotron 82. The gate element 84 of the cryotron is a film of superconducting material. The control and gate elements of the cryotron are insulated from one another by a layer of insulation 86. The entire structure may be made in the manner similar to that already described, namely by vacuum evaporation of the various layers through appropriate masks.

An important advantage of using a cryotron for sensing the digit read out of the memory is that the cryotron is in the same environment as the memory (in a helium bath, for example). This makes it possible to do the logic required in the computer of which the memory of the invention is a part without first requiring that the signal read out of the memory be brought to "the outside world" (to equipment at room temperature). Thus, signal loss is substantially lessened. A second advantage of the sensing scheme shown in FIG. 7 is that the cryotron is immediately adjacent to the memory and therefore very little time is lost in the transmission of the memory output signal to the memory sensing device.

Although the invention has been described in terms of a superconductor memory, the invention is useful in any type of memory employing a plane or film of material for storage in which the film normally shields a magnetic field but, when properly excited during the read-out, permits a magnetic field to penetrate through the film. The use of superconductors for the parallel plane transmission line, however, does have the advantage that there is very little or no $I^2R$ loss in signal during the propagation of the signal through the line.

The structure shown in FIG. 6 (or FIG. 7) corresponds to one memory plane. In practice, a large number of such planes may be stacked one over the other. For example, in a memory employing a 50 bit word length, 50 such planes may be employed, each with its own TEM parallel plane line. The 50 planes may be read out in parallel.

What is claimed is:

1. In a thin film superconducting memory,
a superconductor film forming a memory plane;
a first insulator film on one surface of the memory plane;
intersecting X and Y drive lines which are insulated from one another located on the insulator film;
a second insulator film on the surface of the superconductor film opposite the one on which the drive lines are located;
a conductor film on the second insulator film and lying beneath the X and Y drive line intersections;
a connection between one edge of the conductor film and a corresponding edge of the superconductor film; and
output means coupled to the edges of the conductor and superconductor films, respectively, opposite the edge at which they are connected.

2. A sensing arrangement for a superconductor memory having a memory plane comprising a conductive plane arranged parallel to the memory plane and forming therewith a TEM transmission line; a connection between the two planes at one end of the line; and a pair of output terminals, one connected to each plane, at the other end of the line.

3. A superconductor memory comprising, a superconductor memory plane; a conductor plane arranged parallel to the memory plane and coupled at one edge to a corresponding edge of the memory plane; and a pair of output terminals at the edges of the two planes opposite those at which the two planes are coupled.

4. A superconductor memory comprising, a superconductor memory plane; a second superconductor plane arranged parallel to the memory plane and joined along one entire edge to an edge of the memory plane; and a pair of output terminals at the edges of the two planes opposite those at which the two planes are coupled.

5. A superconductor memory comprising, a superconductor memory plane; a second superconductor plane arranged parallel to the memory plane and joined along one entire edge to a corresponding edge of the memory plane by a connection which is itself a superconductor; and a pair of output terminals at the edges of the two planes opposite those at which the two planes are coupled.

6. A superconductor memory comprising, a superconductor memory plane; a second superconductor plane arranged parallel to the memory plane and coupled at one edge to a corresponding edge of the memory plane; a pair of output terminals at the edges of the two planes opposite those at which the two planes are coupled; and a twisted wire transmission line coupled to said output terminals.

7. An arrangement for sensing the output of a superconductor memory having a superconductor memory plane comprising, in combination, a superconducting plane arranged parallel to the memory plane and forming therewith a parallel plane transmission line; output terminals on an end of the line in the direction of wave propagation in the TEM mode along the line; and a connection between the planes at the other end of the line.

8. In a thin film superconducting memory,
a superconductor film forming a memory plane;
a first insulator film on one surface of the memory plane;
intersecting X and Y drive lines which are insulated from one another located on the insulator film;
a second insulator film on the surface of the superconductor film opposite the one on which the drive lines are located;
a substantially continuous sheet conductor film on the second insulator lying beneath all of the X and Y drive line intersections; and
output means coupled to the conductor film at which an output signal is produced when the magnetic field due to concurrent drive signals penetrates through the memory plane and into the space between the superconductor and conductor films.

9. In a thin film superconductor memory, a first superconductor film forming a memory plane; drive lines located on and insulated from one surface of the memory plane; an insulator film on a surface of the memory plane opposite the one on which the drive lines are located; a second superconductor film on the insulator film, the two superconductor films forming together a TEM, parallel-plane, transmission line; means joining the two superconductor films at one edge portion thereof for terminating said transmission line; and means at the opposite edge portion of the two films for receiving a wave propagated along the transmission line.

10. In a superconductor memory, a superconductor film forming a memory plane; drive lines located on and insulated from one surface of the memory plane; an insulator film on a surface thereof of the memory plane opposite the one on which the drive lines are located; a second superconductor film on the insulator film, the two superconductor films forming together a TEM, parallel-plane, transmission line; a superconducting connection between the two superconductor films along one edge portion of the films for terminating said transmission line; and output means at the opposite edge portion of the two films for receiving a wave propagated along the transmission line, said output means including a twisted wire transmission line.

11. In a superconductor memory, a superconductor film forming a memory plane; drive lines located on and insulated from one surface of the memory plane; an insulator film on a surface thereof of the memory plane opposite the one on which the drive lines are located; a second superconductor film on the insulator film, the two superconductor films forming together a TEM, parallel-plane, transmission line; a superconducting connection between the two superconductor films along one edge portion of the films for terminating said transmission line; and output means at the opposite edge portion of the two films comprising superconductor extensions of the two films which together form the gate element of a cryotron and a control element of said cryotron within said gate element.

12. In the thin film superconducting memory, a superconductor film forming a memory plane; a first insulator film on one surface of the memory plane; X and Y drive lines which are insulated from one another located on the insulator film; a second insulator film on the surface of the superconductor film opposite the one on which the drive lines are located; a superconductor film on the second insulator film, the two superconductor films forming together a TEM, parallel-plane, transmission line; a superconducting connection joining the two superconductor films at one edge portion thereof for terminating said transmission line; and output means at the opposite edge portion of the two films for receiving a wave propagated along the transmission line, said drive lines extending at substantially right angles from the edges of the two superconductor films to minimize the coupling between the drive lines and the two superconductor films at the edges of the two superconductor films.

13. In a thin film superconducting memory,
a superconductor film forming a memory plane;
a first insulator film on one surface of the memory plane;
intersecting X ad Y drive lines which are insulated from one another located on the insulator film;
a second insulator film on the surface of the super conductor film opposite the one on which the drive lines are located;
a conductor film on the second insulator film occupying the area beneath all X and Y drive line intersections;
a connection joining the superconductor film to the conductor film at one edge portion of the films; and
output means at the opposite edge portion of the superconductor and conductor films for receiving an output when a magnetic field penetrates through the memory plane.

14. In a thin film superconducting memory,
a superconductor film forming a memory plane;
a first insulator film on one surface of the memory plane;
intersecting X ad Y drive lines which are insulated from one another located on the insulator film, to a selected pair of which concurrent drive signals may be applied;
a second insulator film on the surface of the superconductor film opposite the one on which the drive lines are located;
a conductor film having a relatively extensive area located on the second insulator film and overlapping all of the X and Y drive line intersections; and
output means coupled to the conductor film at which an output signal is produced when the magnetic field due to concurrent drive signals penetrates through the memory plane and into the space between the superconductor and conductor films.

15. In a superconductor memory,
a superconductor first film forming a memory plane;

drive lines located on and insulated from one surface of the memory plane;
an insulator film on the surface of the memory plane opposite the one on which the drive lines are located;
a conductor second film on the insulator film;
a superconductor connection between the first and second films at one edge portion of the films; and
output means connected to the opposite edge portion of the two films, respectively, comprising a twisted pair.

16. In a superconductor memory,
a superconductor first film forming a memory plane;
drive lines located on and insulated from one surface of the memory plane;
an insulator film on the surface of the memory plane opposite the one on which the drive lines are located;
a conductor second film on the insulator film;
a connection between the first and second films at one edge portion of the films; and
output means at the opposite edge portion of the two films.

17. In a superconductor memory,
a superconductor first film forming a memory plane;
drive lines located on and insulated from one surface of the memory plane;

an insulator film on the surface of the memory plane opposite the one on which the drive lines are located;
a conductor second film on the insulator film;
a superconductor connection between the two superconductor films along one edge portion of the films; and
output means at the opposite edge portion of the two films comprising superconductor extensions of the two films which together form the gate element of a cryotron, and a control element of said cryotron within said gate element.

References Cited by the Examiner

UNITED STATES PATENTS

| | | | |
|---|---|---|---|
| 2,903,656 | 9/57 | Weisbaum | 333—95 |
| 2,989,714 | 6/61 | Park et al. | 340—173.1 |
| 2,993,205 | 7/61 | Cooper | 333—95 |
| 3,048,825 | 8/62 | Schmidlin | 340—173.1 |

OTHER REFERENCES

Pages 41 and 42, February 1961, IBM Technical Disclosure Bulletin.

IRVING L. SRAGOW, *Primary Examiner.*